United States Patent [19]
Orr et al.

[11] Patent Number: 5,668,554
[45] Date of Patent: Sep. 16, 1997

[54] RADAR DETECTOR DISPLAY

[75] Inventors: Steven K. Orr, Loveland, Ohio; Julie Roth, Highland Park, Ill.

[73] Assignee: Cincinnati Microwave, Inc., Cincinnati, Ohio

[21] Appl. No.: 710,839

[22] Filed: Sep. 23, 1996

Related U.S. Application Data

[63] Continuation of Ser. No. 371,833, Jan. 12, 1995, abandoned.

[51] Int. Cl.$^6$ .................... G01S 7/40; G01S 7/26
[52] U.S. Cl. .................... 342/20; 345/38; 342/176
[58] Field of Search .................... 342/20, 176; 345/33, 345/35, 38, 50; D10/46, 98, 104, 121; D20/12

[56] References Cited

U.S. PATENT DOCUMENTS

| | | | |
|---|---|---|---|
| D. 253,752 | 12/1979 | Dilgard, Jr. | D10/104 |
| D. 282,725 | 2/1986 | Imazeki | D10/104 |
| D. 338,841 | 8/1993 | Davis et al. | D10/104 |
| D. 355,616 | 2/1995 | Gregg, III et al. | D10/104 |
| 3,060,427 | 10/1962 | Jaffe et al. | 342/13 |
| 4,381,505 | 4/1983 | Dion | 345/33 |
| 4,388,589 | 6/1983 | Molldrem, Jr. | 324/96 |
| 4,818,997 | 4/1989 | Holmes | 342/20 |
| 4,876,536 | 10/1989 | Matai et al. | 340/825.44 |
| 4,887,086 | 12/1989 | Unser et al. | 342/20 |
| 4,906,999 | 3/1990 | Harrah et al. | 342/20 |
| 4,949,088 | 8/1990 | Ryan et al. | 342/20 |
| 5,034,747 | 7/1991 | Donahue | 342/20 |
| 5,079,553 | 1/1992 | Orr | 342/20 |
| 5,146,226 | 9/1992 | Valentine et al. | 342/20 |
| 5,182,553 | 1/1993 | Kung | 340/825.44 |
| 5,192,947 | 3/1993 | Neustein | 340/825.44 |
| 5,206,500 | 4/1993 | Decker et al. | 340/557 |
| 5,250,951 | 10/1993 | Valentine et al. | 342/20 |
| 5,268,689 | 12/1993 | Ono et al. | 342/20 |
| 5,305,007 | 4/1994 | Orr et al. | 342/20 |
| 5,528,255 | 6/1996 | Hagimori | 345/35 |

FOREIGN PATENT DOCUMENTS

| | | | |
|---|---|---|---|
| 588329 | 3/1994 | European Pat. Off. | 345/38 |
| 243429 | 10/1986 | Japan | 345/50 |
| 316900 | 12/1989 | Japan | 345/33 |
| 46487 | 2/1990 | Japan | 345/33 |

OTHER PUBLICATIONS

Advertisement for Whistler 1490, Road & Track, p. 167 Oct. 1995.
Advertisement for Passport 5000, Road & Track, p. 138 Oct. 1995.
Advertisement for Passport 4500 Superlutide, *Car and Driver*, p. 43, Nov. 1993.
Advertisement for BEL 645STi, *Car and Driver*, Jan. 1994, p. 4.
"Five Budget Radar Detectors," Schroeder, Don, *Car and Driver*, Sep. 1995, pp. 87–95.

*Primary Examiner*—John B. Sotomayor
*Attorney, Agent, or Firm*—Limbach & Limbach, LLP

[57] ABSTRACT

A radar detector includes a graphical display for displaying a spectral representation of detected signals.

9 Claims, 3 Drawing Sheets

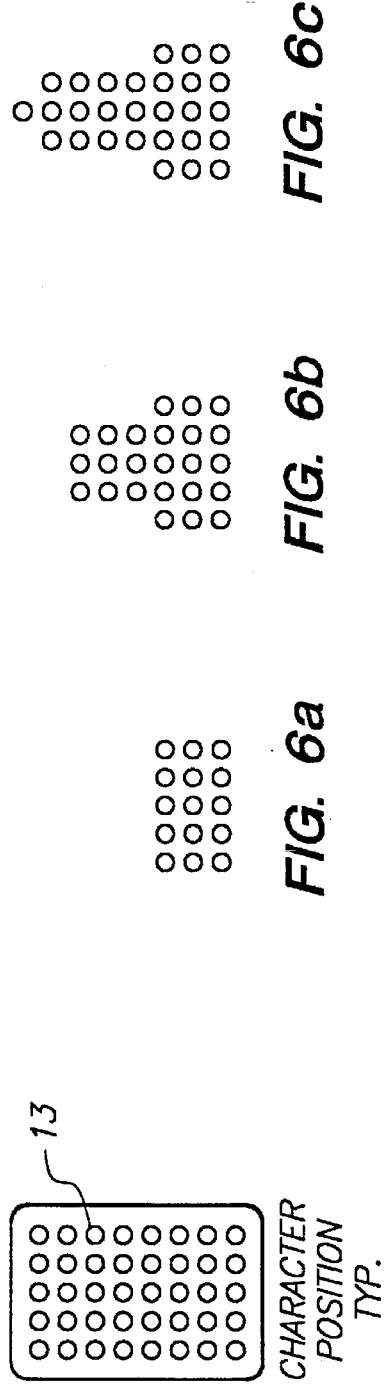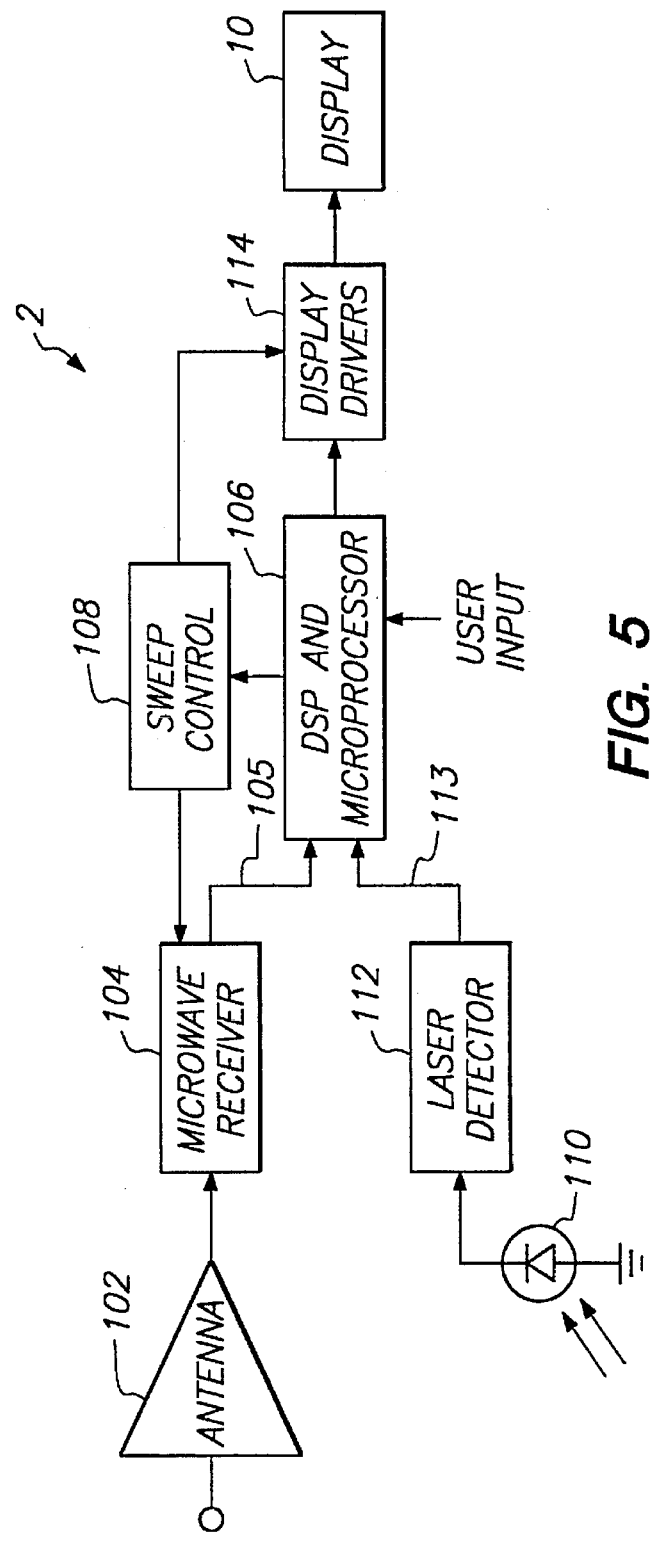

RADAR DETECTOR DISPLAY

This is a continuation of application Ser. No. 08/371,833, filed Jan. 12, 1995, now abandoned.

FIELD OF INVENTION

The present invention relates to a police radar detector, and more particularly to a display for a police radar detector which provides graphical information about detected signals, thereby allowing a user to visually differentiate between valid police radar signals and false signals.

BACKGROUND OF THE INVENTION

An electronic assembly for detecting the presence of police radar signals is generally known and will be referred herein as a radar detector. The radar detector is mounted in a vehicle and provides an audible or visible alert when a police radar signal is detected. The general operation of police radar detectors is described in U.S. Pat. No. 4,313,216; U.S. Pat. No. 4,581,769; U.S. Pat. No. 4,954,828; U.S. Pat. No. 5,049,885; U.S. Pat. No. 5,079,553; and U.S. Pat. No. 5,305,007, all of which are commonly owned by the assignee herein, Cincinnati Microwave, Inc.

Police radar guns broadcast signals in frequency bands which are allocated and regulated by the Federal Communications Commission, as follows: X-band (10.525 GHz±25 MHz); K-band (24.15 GHz±50 MHz); and Ka-band (34.7 GHz±500 MHz). More recently, police radar guns emit pulsed-laser signals in the infrared range.

The radar detector display apparatus described in U.S. Pat. No. 5,305,007 is typical of conventional radar detectors, wherein light emmitting diodes (LED's) are arranged in a linear fashion and illuminated in accord with the detection scheme upon detection of of a valid signal. Similarly, U.S. Pat. No. 4,818,997 describes an analog indicator 108 which indicates the signal strength of a detected signal. Yet another display apparatus is described in U.S. Pat. No. 4,949,088, wherein a siganal indicator 26 is illuminated with different colors to indicate which radar band is active. Still another type of radar detector display apparatus is described in U.S. Pat. No. 5,146,226, wherein the display apparatus has a signal strength LED bargraph 112E, a digital display 112A indicating the number of detected incoming signals, and a LED decimal point 112D which may be illuminated, turned off, or flashed to indicate the radar band of the incoming signal(s).

In some environments, false signals may be detected in a police radar band, such as those commonly transmitted in the X-band by garage door openers or motion detectors, and the radar dectector may be unable to distinguish a true police radar signal from these false signals.

In attempts to provide immunity against false alarms, radar detectors have incorporated signal processing techniques which use software programmable algorithms to discriminate between false and valid police radar signals. Such techniques evaluate the signal characteristics of the detected signal and generate an alert only when the requirements of the detection scheme are satisfied. Such techniques have proven successful in providing immunity against false signals emanating from other police radar detectors, as described in U.S. Pat. No. 5,305,007. However, such solutions may be costly to implement.

Conventional radar detector displays indicate the radar band and signal strength of an detected signal. However, such information is not useful if the detected signal is not a valid police radar signal, but instead, a signal from another radio source broadcasting within the same radar band. As the number of radio sources broadcasting signals within police radar bands continues to grow due to usage of motion detectors, remote controls for garage doors and the like, the need for a low cost solution which permits identification and discrimination of such false signals is evident. Accordingly, it would be desirable to have an apparatus which could provide information to assist the user in distinguishing valid police radar signals from false signals occurring within the same radar band.

SUMMARY OF THE INVENTION

The present invention provides a graphical display apparatus for a radar detector on which a spectral representation of detected signals may be displayed. In the preferred embodiment, the graphical display apparatus is a liquid crystal display having two rows of character patterns defined thereon. The top row is used for displaying text messages with standard alphanumeric characters. The bottom row is used for displaying special graphical characters. The character patterns for each row are driven by a microprocessor for each signal detected by the radar detector.

Because signals may be detected in any one of a plurality of predefined frequency bands, such as the X band, the K band, the Ka band or the Laser band, the display is scaled for each detected signal to correspond to the frequeney band in which the signal is found. Then, using special predefined graphical characters, the detected signal is displayed in its relative frequency position within the band. Advantageously, the relative amplitude of the detected signal may also be indicated via the height of the graphical characters.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

FIG. 4 is a schematic view of one character position of the display portion.

FIG. 5 is a simplified block diagram of the radar detector according to the present invention.

FIGS. 6a, 6b and 6c are schematic views of preferred character patterns.

DETAILED DESCRIPTION OF THE INVENTION

Figure 1:
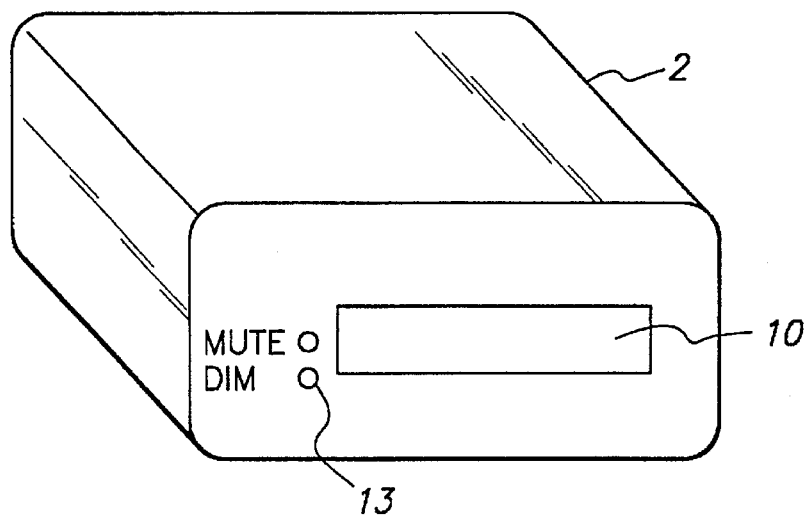
FIG. 1 is a front perspective view of a radar detector constructed in accordance with the present invention.

FIG. 1 shows a radar detector apparatus 2 having a display 10 constructed in accordance with the present invention. One or more buttons 13 are conveniently located on the radar detector to to provide the user with selectable features, such as power, mute, dim, etc. Upon detection of a signal within one or more predefined frequency bands, the radar detector 2 may provide an audible alert through a speaker (not shown), as is well known in the art, but will also provide a unique visible alert on display 10, as hereinafter described.

A block diagram of the preferred radar detector 2 is presented in FIG. 5. The radar detector 2 includes an antenna 102 and microwave receiver 104 for receiving and processing incoming signals in predefined microwave bands, such as the X band, the K band and the Ka band. There are many known microwave receivers which would suffice for this application. In the preferred embodiment, the microwave receiver 104 uses a voltage controlled oscillator to sweep each band under control of a sweep circuit 108 and provides detected signals 105 to a digital signal processor and/or microprocessor 106. The relative location of a detected signal 105 may be correlated by the microprocessor 106 to the relative position of the sweep when a signal detection occurs. Such a device is described in U.S. Pat. No. 5,305,007, the disclosure of which is expressly incorporated herein by reference.

Advantageously, Laser radar signals may also be detected utilizing photodetector 110 and laser detection circuit 112. Laser detection circuit 112 provides logic signals 113 to the microprocessor 106 upon detection of a signal in the infrared band in a manner described in U.S. Pat. No. 5,206,500, the disclosure of which is expressly incorporated herein by reference.

Upon detection of a signal by the radar detector, the microprocessor 106 controls display drivers 114 for displaying a visible graphic alert on display 10. For example, in the sweep-to-sweep correlation method described in U.S. Pat. No. 5,305,007, when a signal is detected, a position index indicative of the sweep position is stored for reference on the next sweep. If, on the next sweep, the signal is detected in the same position, then the signal is validated and a detect condition is alerted.

The preferred embodiment for radar detector 2 may be realized in a PASSPORT 5000 radar detector manufactured and sold by Cincinnati Microwave, Inc. This product includes a Texas Instruments TMS320c15 microprocessor for digital signal processing and other control functions, as described in U.S. Pat. No. 5,305,007, which may easily be programmed to realize alternative detection and reporting schemes, as well as the additional processing necessary to drive a graphical display as disclosed herein. However, as can be appreciated by one with ordinary skill in the art, there are many other radar detectors known and commercially available which could be modified as taught herein without departing from the scope of the invention.

In accordance with the present invention, the display 10 is preferably a liquid crystal display. Such displays are generally known to have a thin film of liquid crystal material sandwiched between a pair of electrodes, such as glass having a metal oxide film thereon, with segment patrerns photoetched into one or both of the metal oxide coated glass plates and driven by electronic segment drivers. Because the details for constructing such a liquid crystal display are not particularly relevant to the present invention, they are not disclosed herein. However, as can be appreciated by one with skill in the art, other types of displays could also be constructed without departing from the scope of the invention, such as gas plasma, LED, raster scan, or the like.

Figure 3:
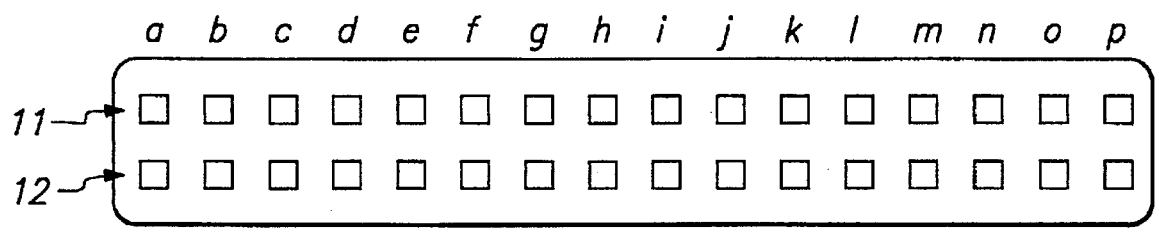
FIG. 3 is a schematic view of the display portion showing individual character positions.

In the preferred embodiment, as shown in FIG. 3, the liquid crystal display screen 10 will be constructed to have a display geometry that defines two lines 11 and 12 each having sixteen character positions 11a–p and 12a–p, respectively. As described above and known to those skilled in the art, each character position 11a–p and 12a–p may be photoetched with an identical pattern to permit display of a text or graphic character in each position. The preferred pattern is a matrix of dots 13 in a 5×8 arrangement as shown in FIG. 4.

Each character position 11a–p and 12a–p is driven in a conventional manner by the microprocessor 106 or separate display driver 114 to display any predefined character, including standard alphanumeric characters or special graphical characters as further described below.

Preferably, the top line 11 of the display 10 is used to display text messages and the bottom line 12 is used to display graphical characters. However, for some text messages, both lines 11 and 12 may be used. For example, on power up of the radar detector 2, a message such as:

Power On—Self

Test in Progress may be fully displayed on both lines 11 and 12 as indicated.

The bottom line 12 is generally used to display graphical characters. For example, when the radar detector begins scanning for signals to detect, the bottom line 12 displays a scanning cursor by illuminating the eighth row of each character position. Preferably, special graphical characters are provided to give a simple spectral representation of the detected signal showing its amplitude and relative location within one of the predefined frequency bands. Thus, bottom line 12 can be advantageously scaled in the horizontal direction to have each character position correspond to convenient segments of the frequency band of the detected signal, such as the X band, the K band, the Ka band or the Laser band. For example, the Ka band is 100 MHz in width, therefore, the sixteen character positions in line 12 can be scaled to each represent 100÷16=6.25 MHz. Likewise, each character position can provide a scaled indication in the vertical direction by adding rows of dots to indicate increasing amplitude or other signal characteristic. Thus, in FIG. 2, the relative frequency position of the detected signal within its frequency band is indicated by icon or symbol 14 as illuminated on the bottom line 12 of display 10. The correct position of the icon is determined by mapping the position index as stored in microprocessor 106 onto the appropriate character position. For example, if the range of possible signal indices is 0–16000, then a signal having an index between 0 and 1000 may be mapped onto character position 12a, a signal having an index between 1000 and 2000 may be mapped onto character position 12b, etc. The relative amplitude of the detected signal is also stored in microprocessor 106 upon detection and may be indicated by adjusting the vertical height of the symbol 14, i.e., by illuminating more or less rows of dots. A text message on top line 11 advantageously indicates which predefined frequency band the detected signal is in.

Figure 2:
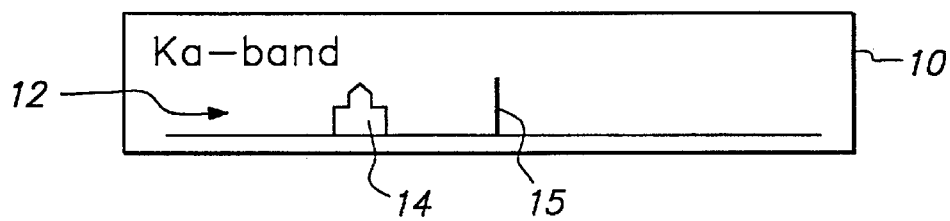
FIG. 2 is a from plan view of the display portion of the radar detector.

A detected signal will be displayed by illuminating at least one row of dots in a character position. The relative amplitude of the signal will be indicated by illuminating additional rows of dots in the character position. For example, a particularly preferred embodiment has three predefined graphical characters corresponding to three amplitude magnitudes, namely a low rectangle as shown in FIG. 6a corresponds to a low amplitude signal; adding a box on top of the rectangle corresponds to a medium amplitude signal, as shown in FIG. 6b; and adding a triangle over the box as shown in FIG. 6c corresponds to a high amplitude signal. Additionally, a center line character 15 can be provided as indicated in FIG. 2, for example, as a 1×8 dot matrix occupying character position 12h.

Figure 7:
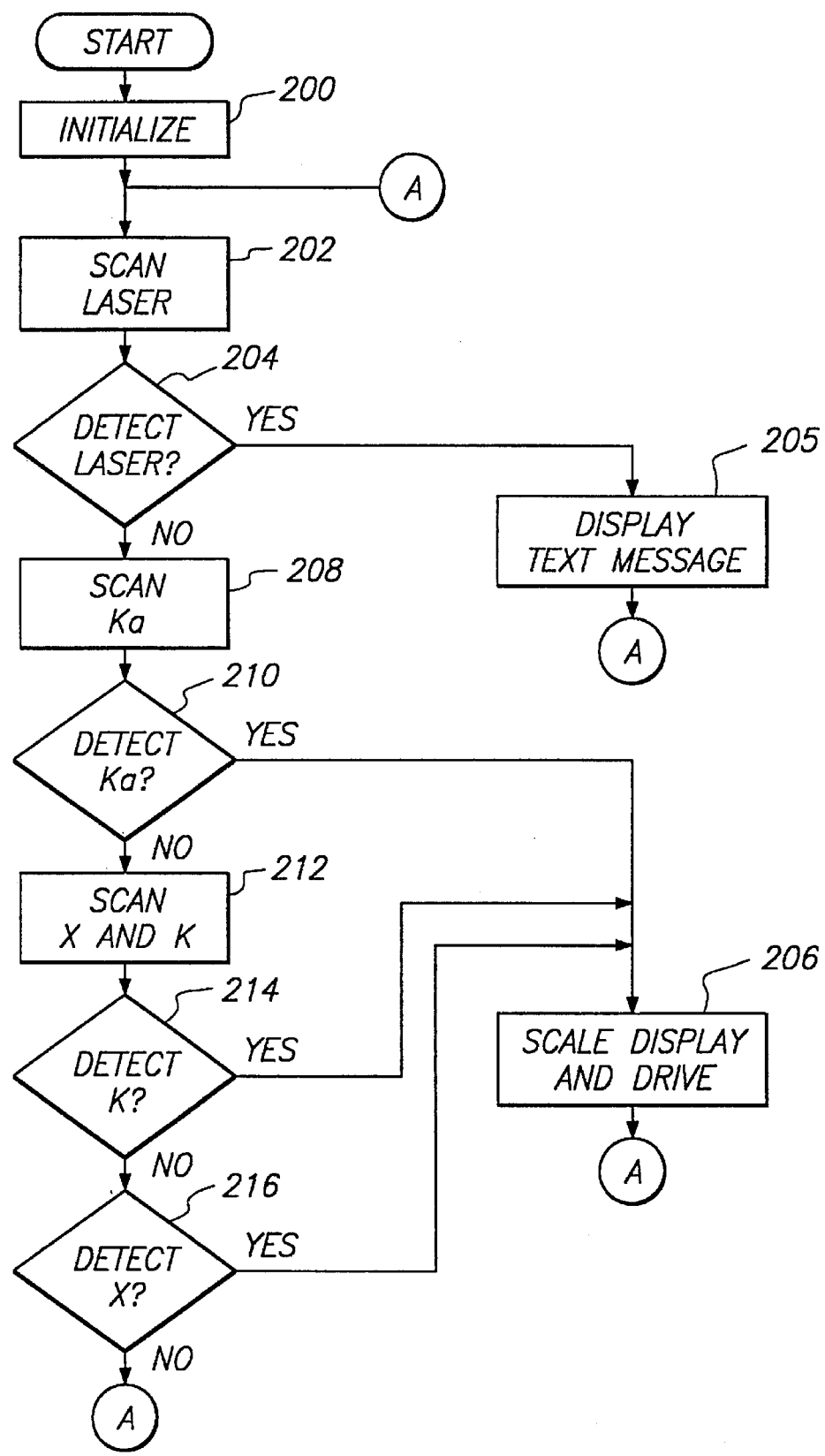
FIG. 7 is a flow chart illustrating the display driver program.

Thus, it can be seen that insofar as the display driver is concerned, only a simple control program is required. The program may be implemented in microprocessor 106 in various software forms in accord with the flow chart of FIG. 7. According to the program, an initialization routine is carried out in step 200 upon power up or reset of the radar detector and a suitable message may be displayed. Then, in step 202, the radar detector scans the Laser or infrared band. If a signal is detected in this band (step 204), then a text message "Laser" is displayed on display 10 (step 205). A spectral representation of a Laser band signal is not displayed in the present embodiment since the primary problem addressed by this disclosure is the presence of false signals in microwave bands. However, it would certainly be possible to construct suitable circuits to provide a spectral or graphical display of a detected optical signal.

If a Laser band signal is not detected, then the Ka band is scanned (step 208). If a signal is detected in this band (in step 210), then the signal is properly scaled and displayed on display 10 (step 206).

If a Ka band signal is not detected, then the X and K bands are commonly scanned (step 212). If a signal is detected in the K band (step 214), then the signal is properly scaled and displayed on display 10 (step 206). If a signal is detected in the X band (step 216), then the signal is properly scaled and displayed on display 10 (step 206). If no signal is detected (or after any signal is detected and displayed), the routine loops back to step 202 and repeats.

Displaying detected signals in this manner allows a user to acquire a knowledge of local or usual microwave sources. For example, the user will learn from experience the relative location and amplitude of garage door openers, automatic door sensors, and possibly, police radar guns. Thus, one can develop the ability to visually identify with a greater degree of confidence a valid police radar signal.

It should be understood that the invention is not intended to be limited by the specifics of the above-described embodiment, but rather defined by the accompanying claims.

We claim:

1. A radar detector, comprising:
   a display screen including means for defining a plurality of character positions geometrically across the display screen including at least a first row having a first plurality of character positions arranged in a linear manner,
   means for scaling the first row to correspond to at least one predefined microwave frequency band, wherein each of the first plurality of character positions is scaled to correspond to a contiguous segment of the predefined microwave frequency band,
   means for detecting a microwave signal within the at least one predefined microwave frequency band,
   means for identifying the contiguous segment of the predefined microwave frequency band in which the microwave signal is detected,
   means for storing at least a first predefined character, and
   means for driving the display screen to display the first predefined character in the character position in the first row which corresponds to the identified segment.

2. The radar detector of claim 1, wherein the detecting means comprises means for detecting a microwave signal within any one of a plurality of predefined microwave frequency bands, and wherein the scaling means comprises means for selectively scaling the first row to correspond to the predefined microwave frequency band in which the microwave signal is detected.

3. The radar detector of claim 2, wherein the plurality of predefined microwave frequency bands include the Ka band, the K band and the X band, and wherein the detecting means scans each of the predefined microwave frequency bands in a predetermined order.

4. The radar detector of claim 1, wherein the display screen further comprises a second row having a second plurality of character positions arranged in a linear manner, wherein the storing means includes means for storing a plurality of predefined characters, and wherein the driving means includes means for driving the display screen to display at least one predefined character in the second row in response to the detected microwave signal.

5. The radar detector of claim 1, wherein the identifying means includes means for identifying a first magnitude of at least one additional characteristic of the detected microwave signal, and wherein the scaling means includes means for scaling each character position in a vertical manner to correspond with a range of the at least one additional characteristic, and wherein the driving means includes means for driving the display screen to display the first predefined character in the character position in the first row which corresponds to the identified segment and with a vertical scaling corresponding to the first magnitude.

6. The radar detector of claim 5, wherein the at least one additional characteristic is an amplitude of the detected microwave signal.

7. The radar detector of claim 5, wherein the at least one additional characteristic is a signal strength of the detected microwave signal.

8. A radar detector, comprising:
   a display screen including means for defining a plurality of character positions geometrically across the display screen,
   a microwave detection circuit having means for means for detecting a microwave signal within at least one predefined microwave frequency band and for generating at least a first output signal indicative of the detected microwave signal,
   a laser detection circuit having means for detecting an infrared signal and for generating at least a second output signal indicative of the detected infrared signal,
   means for storing a plurality of predefined characters including a plurality of predefined text messages,
   control means for selecting a predefined text message in response to the first output signal or the second output signal, and
   means for driving the display screen to display the selected predefined text message.

9. The radar detector of claim 8, further comprising:
   the display screen including at least a first row having a first plurality of character positions arranged in a linear manner,
   means for scaling the first row to correspond to the at least one predefined microwave frequency band, wherein each of the first plurality of character positions is scaled to correspond to a contiguous segment of the predefined microwave frequency band,
   means for identifying the contiguous segment of the predefined microwave frequency band in which the microwave signal is detected,
   means for driving the display screen to display a predefined character in the character position in the first row which corresponds to the identified segment.

* * * * *

UNITED STATES PATENT AND TRADEMARK OFFICE
CERTIFICATE OF CORRECTION

PATENT NO. : 5,668,554
DATED : September 16, 1997
INVENTOR(S) : Steven K. Orr and Julie Roth It is certified that error appears in the above-indentified patent and that said Letters Patent is hereby corrected as shown below:

Column 6, Line 35, "means for", second occurrence, should be deleted.

Column 1, Line 34, "emmitting" should read --emitting--.

Column 1, Line 40, "siganal" should read --signal--.

Column 1, Line 66, "an" should read --a--.

Column 2, Line 45, "from" should read --front--.

Column 3, Line 53, "patrems" should read --patterns--.

Column 5, Line 23, "Ira" should read --If a--.

Signed and Sealed this

Thirtieth Day of March, 1999

Q. TODD DICKINSON

Attest:

Attesting Officer

Acting Commissioner of Patents and Trademarks